United States Patent
Ghouse

[19]

[11] Patent Number: 5,996,176
[45] Date of Patent: Dec. 7, 1999

[54] FREE FLOATING CASTOR

[76] Inventor: S M Ghouse, Baitus-Salam, 11-4-636, A.C. Guards, Hyderabad-500 004, India

[21] Appl. No.: 09/055,719

[22] Filed: Apr. 6, 1998

[51] Int. Cl.⁶ .................................................. B60B 33/00
[52] U.S. Cl. ............................... 16/29; 16/18 R; 16/35 D
[58] Field of Search ................................ 16/29, 39, 31 A, 16/31 R, 40, 18 R, 35 D

[56] References Cited

U.S. PATENT DOCUMENTS

| | | | |
|---|---|---|---|
| 1,839,396 | 1/1932 | Kimball | 16/18 R |
| 2,073,066 | 3/1937 | Kalberer | 16/36 X |
| 2,170,257 | 8/1939 | Andersen | 16/31 X |
| 3,758,917 | 9/1973 | Schroer | 16/36 X |

*Primary Examiner*—Harry C. Kim
*Assistant Examiner*—Brian H. Buck
*Attorney, Agent, or Firm*—MacMillan, Sobanski & Todd, LLC

[57] ABSTRACT

A free floating castor includes a wheel assembly mounted to move relative to a vertical axis of rotation at which it is attached to a trolley to provide space for the wheel to move freely within a fixed area. In one embodiment, two parallel shafts of a bracket assembly are attached to the wheel axle, one on each side, thus permitting the wheel axle to slide along the parallel shafts and in between two stoppers/limits. In a second embodiment, a rotary joint assembly is connected between a trailing arm bracket assembly and the bearing for attaching the castor to a trolley permitting the bracket assembly and the wheel assembly to revolve through 360° in the horizontal plane around it.

5 Claims, 8 Drawing Sheets

DEFINITION OF FORCES ACTING ON STANDARD CASTER IN A STABLE CONDITION OF MOTION.

FIG - 2b
PRIOR ART

DEFINITION OF FORCES ACTING ON STANDARD CASTER IN A STABLE CONDITION OF MOTION.

DISPLACEMENT OF FREE FLOATING CASTOR, ALONG LONGITUDINAL AXIS, DURING REVERSAL

FIG - 4b

FREEDOM OF MOVEMENT ALONG FORE AND AFT AXIS

FIG - 4c

DISPLACEMENT OF FREE FLOATING CASTOR, ALONG LONGITUDINAL AXIS, DURING REVERSAL

DISPLACEMENT OF FREE FLOATING CASTOR, ALONG LONGITUDINAL AXIS, DURING REVERSAL

FREE FLOATING CASTOR

BACKGROUND OF THE INVENTION

The present invention relates generally to castors and more particularly to free floating castors.

The state of the art castors, as we are all aware, are wheels that trail the direction of motion of the platform or trolley onto which they are mounted. The wheel in the castor assembly has freedom to revolve, in the horizontal plane, around the vertical axis of the castor assembly, through 360°. The wheel being located at a certain distance (trail distance) from the single vertical axis of the assembly at the end of a trail arm makes the wheel follow the direction of the motion of the trolley.

Standard castors have two inherent flaws—one, the castors have a tendency to get wedged, and two, swiveling/fishtailing of the trolley onto which the castors are fitted when the direction of motion is reversed.

Wedging is a momentary restriction in the smooth motion of a castor trolley experienced during reversal of direction of its travel. While reversing the direction of motion, the castor becomes dynamically unstable. The wheel initially follows the reverse path and then deviates. During this process, the castors have to revolve to re-align. The castors could either revolve in the same or opposite directions. Wedging occurs when both castors revolve either inwards or outwards, i.e., in opposite directions. During the reversal motion, the wheels get dragged momentarily until they realign. In order to overcome wedging, extra effort needs to be applied which will be proportional to the weight on the wheels. This difficulty would, in day-to-day life, have been experienced while handling baggage trolleys at airports, etc.

Fishtailing of the trolley also occurs while reversing. Owing to the revolving action, the castors could revolve in the direction opposite to the intended one. For instance, while reversing the direction from forward to rearward, the castors could revolve in clockwise direction. Thereby, the trolley will swing towards the right hand side. In case of an obstruction ahead and in order to avoid it, one needs to apply additional force to turn left. However, on doing so, one finds a momentary resistance to the effort because the castors are revolving in the wrong direction. By continuing to pull backwards, one could hit the obstacle. The way out would be to push forward again, make the castors revolve in the opposite direction and then pull back or apply enough force to drag the wheels in the desired direction.

SUMMARY OF THE INVENTION

The present invention concerns an apparatus for improving the operation of castors by providing space for the wheel to move freely. The wheel thus can float freely within a fixed area. The principle of implementing the free floating castors can be done in two ways. One is by attaching two parallel shafts to the wheel axis, one on each of its sides, thus making the wheel axle free to slide along the parallel shafts and in between two stoppers/limits. The second principle is that of double rotary joints wherein an additional rotary axis/joint is provided equidistant between the vertical axis and the center of the wheel. The additional rotary axis/joint enables the trail arm to revolve through 360° in the horizontal plane around it. In comparison to this, the standard castors have only one vertical axis.

The entire assembly can be fabricated according to any desired specification. There is no limit either to its size or weight carrying capacity. In terms of costs, the only added cost being that of parallel shafts or rotary joints to a certain extent additional machining and fabrication charges.

Free floating castors find use and can be installed on all trolleys, equipment bodies, automated guided vehicles, etc. on which standard castors are installed. Free floating castors according to the present invention are thus more durable, handy, easier to operate, and allow free and increased maneuverability thereby increasing their efficiency and economy when compared with the state of the art.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2b is a schematic plan view of the standard wheel shown in the FIG. 2a;

FIGS. 4b, 4d and 4 fare elevation views of the free floating castor in accordance with the present invention corresponding to the FIGS. 4a, 4c and 4e respectively;

DESCRIPTION OF THE PREFERRED EMBODIMENT

Castors are wheels that trail the direction of motion of the platform onto which they are mounted. Castors are installed on various types of trolleys, furniture, etc. A generic design of a typical prior art castor assembly 10 is shown in the FIG. 1. For ease of understanding, a platform equipped with castor is referred hereinafter as a "trolley". However, the following description applies to any object equipped with castors.

Figure 1:
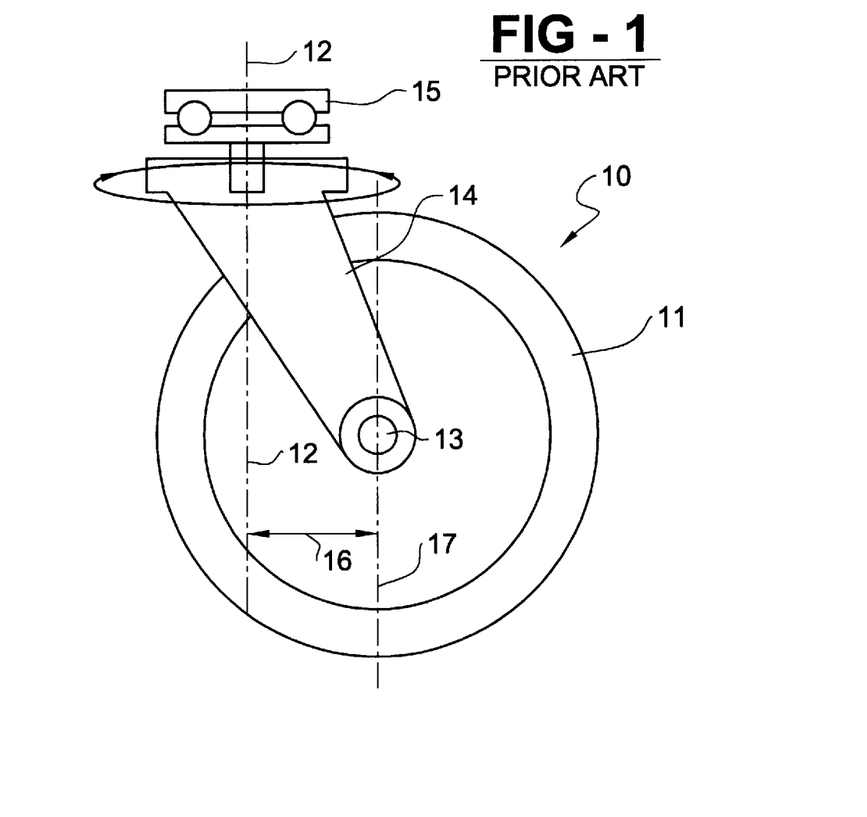
FIG. 1 is a schematic elevation view of a prior art castor.

A wheel 11 of the castor assembly 10 has freedom to revolve, in a horizontal plane, around a vertical axis 12 of the castor assembly, through 360°. The wheel 11 is rotatably mounted on an axle 13 attached to a lower end of a trail arm or bracket 14 having an upper end attached to a bearing for rotation about the vertical axis 12. The arm or bracket 14 extends downwardly at an angle from the bearing 15 so that the axle 13 is located at certain distance 16 from the castor vertical axis 12 of rotation of the assembly 10. This mounting orientation makes the wheel 11 follow/trail the direction of motion of the trolley to which the assembly 10 is attached. To steer a trolley, differential forces are applied.

The standard type castors suffer from, basically, two inherent flaws, any one of which could be experienced whenever the direction of motion of the trolley is reversed. These flaws are, as follows: 1) castors getting wedged; and 2) swiveling/fishtailing of the castors/trolley in the direction opposite to the intended direction of motion. These flaws or defects have been obviated in the free floating castors according to the present invention. However, before discussing the design features of the free floating castors that make this possible, the reasons due to which the above-identified problems occur in respect of the standard castors are discussed below.

Figure 2A:
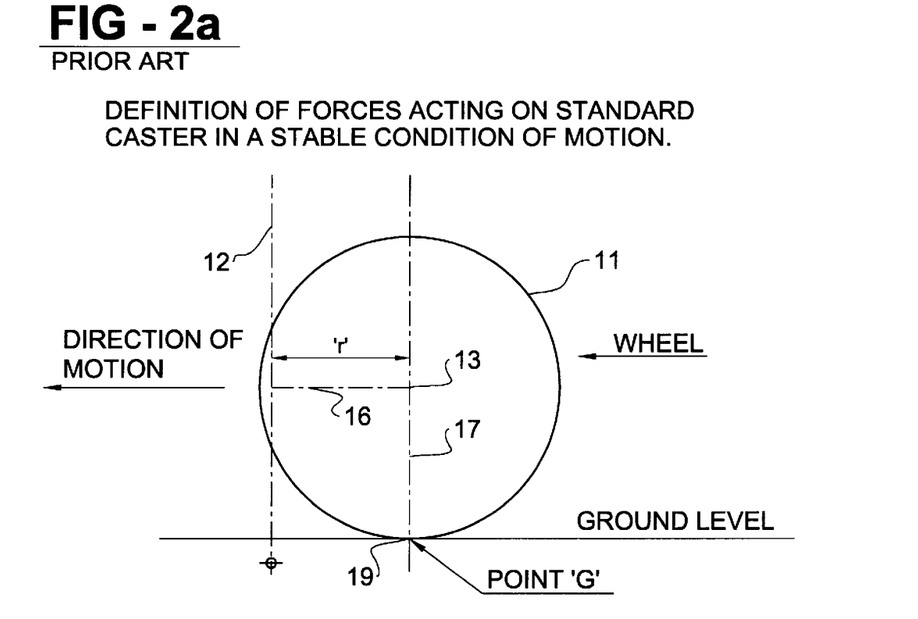
FIG. 2a is schematic elevation view of the standard wheel shown in the FIG. 1.
Figure 2B:
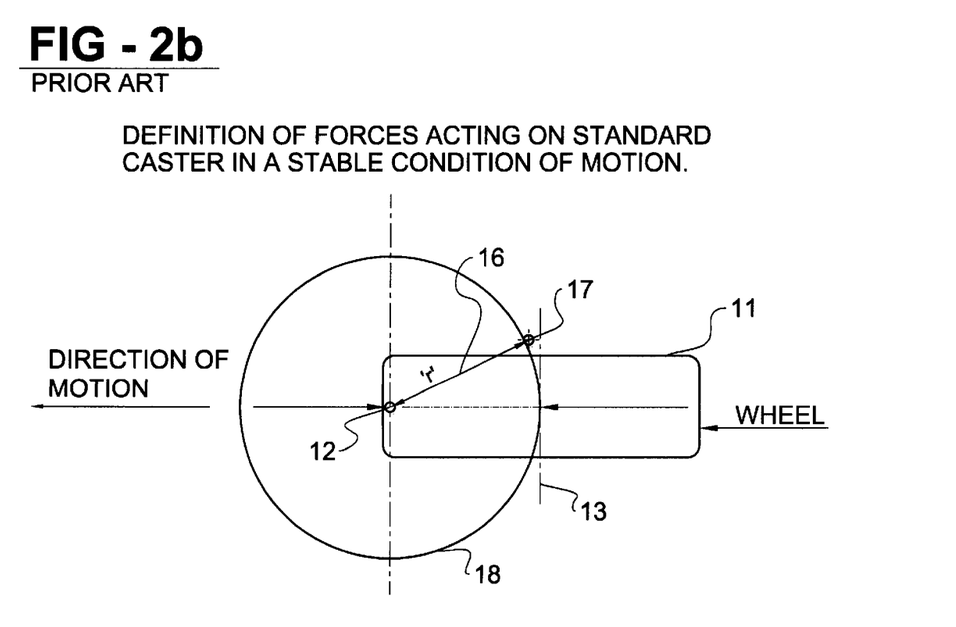

Wedging is the momentary restriction in the smooth motion of a caster equipped trolley, experienced during reversal of direction of its travel. As shown in the FIG. 2a, the castor vertical/revolving axis 12 of the standard castor assembly 10 and a generally parallel vertical axis 17 of the wheel 11 at the axis of rotation 13 are separated by the distance 16 between them. The wheel vertical axis 17 has freedom to revolve in a circle 18, with the castor vertical axis 12 as the center and the distance 16 its radius (see the FIG. 2b). Due to this arrangement, the wheel 11 will trail, at the distance 16 from the axis 12. The wheel 11 will remain in a stable condition during motion.

When reversing the direction of motion, however, the castor assembly 10 becomes dynamically unstable. The wheel 11 initially follows the reverse path for an instant and then deviates. As it moves further away from the direction of travel, a point of contact 19 of the wheel with the ground (see the FIG. 2a) acts as a pivot, around which the castor vertical axis 12 revolves, until the castor assembly gets realigned.

Now, let us consider two castors mounted across a lateral "X" axis 20 (see the FIG. 3a), such as a pair of wheels mounted at the rear corners of a trolley, and moving along a perpendicular "Y" axis 21, such as the longitudinal axis of the trolley. The castors include a pair of wheels 22 and 23 spaced apart by a distance 24. Now, if the direction of motion is reversed, the castors are leading the castor vertical axis 12 and will have to revolve to re-align. During the process, the castors could either revolve in the same or opposite directions.

Figure 3A:
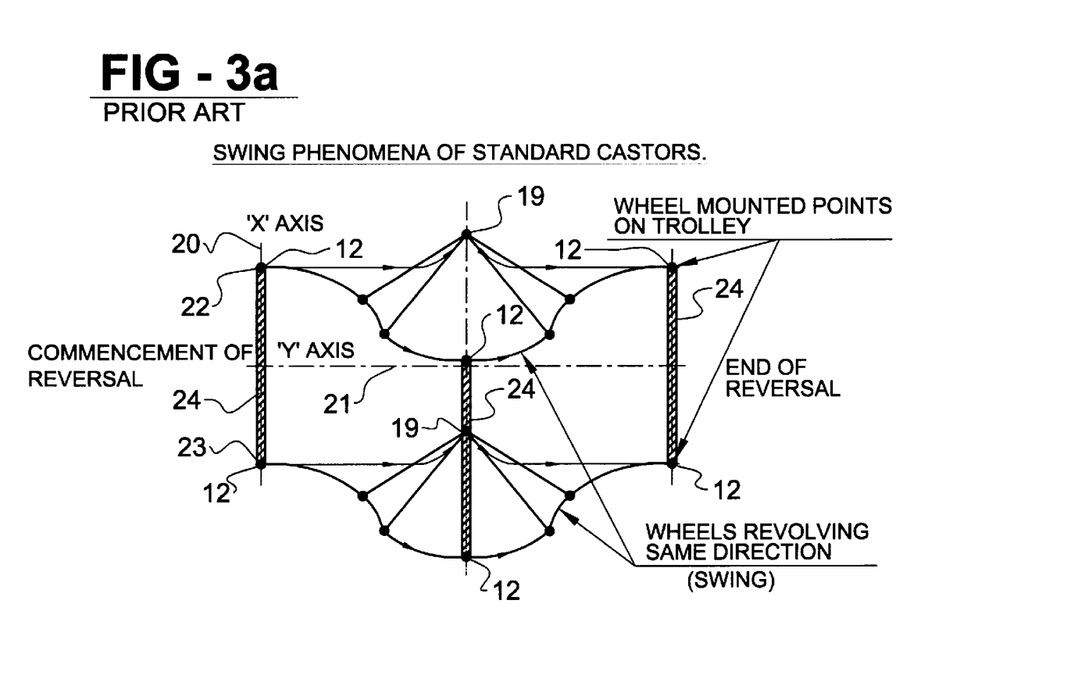
FIGS. 3a and 3b are schematic plan views of the path of travel of the standard wheel shown in the FIG. 1.

Had there been only one castor, or with both castors revolving in the same direction, the castor vertical axis 12 would have been able to describe an arc of radius 16 around the point of contact 19, with the trolley moving along the 'Y' axis 21.

Wedging occurs when both castors revolve either inwards or outwards (see the FIG. 3b) wherein the above described freedom of motion/space will not be available when the two castors revolve in opposite directions. As the trolley moves forward, the wheels 22 and 23 tend to move inwards or outwards, toward the castor vertical axis 12. But, since the distance 16 is fixed, the wheel 11 will get wedged between the castor vertical axis 12 and the point of contact 19. As such, it will only be possible for the wheels 11 to move against friction (slide) which will be a function of the weight on the respective wheel and coefficient of friction.

Figure 3B:
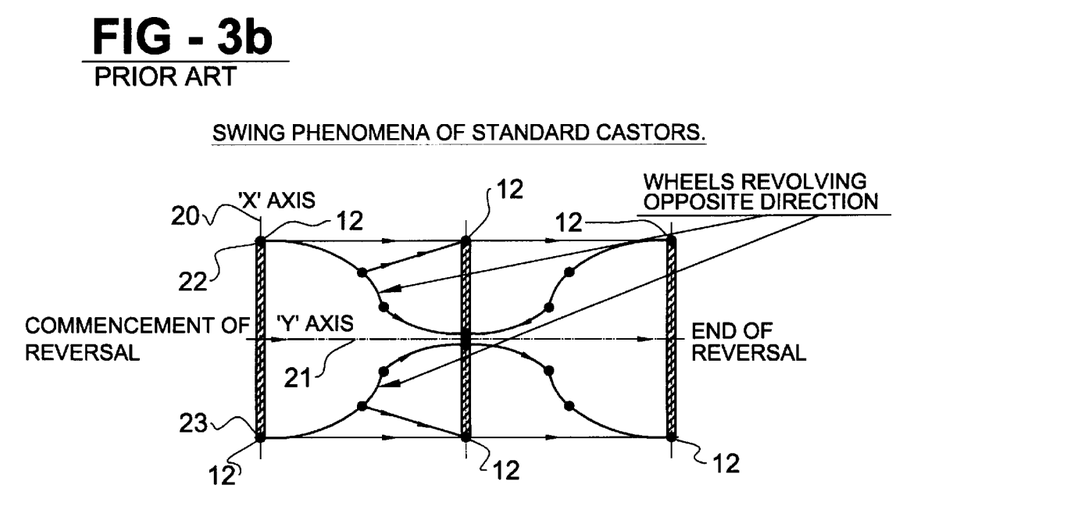

Therefore, the wheels 11 get dragged till they realign. In order to overcome wedging, extra effort will have to be applied to the trolley, which effort will be proportional to the weight on the wheels. This difficulty has been experienced by, almost, all of us, especially while handling baggage trolleys at airports, etc.

While reversing, due to the revolving action, the trolley swings or fishtails (see the FIG. 3a). This would pose no severe problem if enough space is available, to accommodate the revolving or fishtailing. Therefore, let us examine the alternative case.

Let us assume that, while reversing the direction from forward to rearward, the castors revolve in the clockwise direction. The trolley will swing towards the right hand side as shown in the FIG. 3a. Now imagine that there is an obstruction there. In order to avoid it, you might apply force to turn left. However, you will find a resistance to the effort, because the castors are revolving in the wrong direction at this instant. By continuing to pull backwards, you will hit the obstacle. The way out would be to push forward again, make the castors revolve in the opposite direction, and then pull back or apply enough force to drag the wheels in the desired direction.

The problem gets compounded when a trolley has four castors, instead of two. Further, even if there be no obstacle, fishtailing is disconcerting. The trolley does not respond in the desired manner.

From the foregoing, it can be appreciated that the standard castors suffer from certain inherent drawbacks. Although they work quite satisfactorily under stable conditions of motion, this is not the case while reversing or maneuvering in restricted space.

The aforesaid problems have been overcome by incorporating certain unique and innovative design features in the free floating castors according to the present invention as shown in the FIGS. 4a through 4f. The inability of the wheel vertical axis 17 to traverse through the castor vertical axis 12 is the problem to be solved by the castor according to the present invention. As stated above, the radius 16 of the castor assembly is fixed. Due to this, the standard castors suffer from the defects, as discussed. Therefore, if a facility is provided for the wheel 11 to move freely along the distance 16, through the castor vertical axis 12, the problem can be overcome.

In the free floating castors according to the present invention, not only is this movement possible, but the wheel vertical axis 17 can assume any position within the radius 16. Due to this, the wheel 11 can float freely within this area. Thus, the name "Free Floating Castor" has been coined.

The basic design principle of the free floating castor is making the distance 16 variable, within certain limits. This will enable the wheel vertical axis 17 to move across the longitudinal axis of the wheel 11, from one extreme to the other, while reversing the direction of motion. When in motion, the wheel 11 will assume its trail position and be stable (see the FIGS. 4a through 4f).

The above design principle has been successfully implemented through two different approaches, as discussed below. The first embodiment, designated as a parallel float shaft free floating castor assembly 30, includes a wheel assembly 31 and a bracket assembly 32. The bracket assembly 32 is adapted to be attached to a trolley (not shown) by the bearing 15 for rotation in a horizontal plane about the castor vertical axis 12 as described above with respect to the prior art castor assembly 10. The wheel assembly 31 includes the wheel 11 rotatably mounted on the axle 13 axle in the manner described above with respect to the prior art castor assembly 10. Two pulley type rollers 37 are fixed on the axle 13, one on each end of it. The rollers 37 pass between a corresponding pair of parallel shafts 33 and 34, above and below the rollers 37 respectively. The rollers/pulleys 37 have a peripheral groove for engaging either of the parallel shafts, 33 or 34. The gap between the upper and lower parallel shafts, 33 and 34, is more than the inner diameter and less than the outer diameter of the pulley 37. Therefore, the rollers 37 can roll freely between the two shafts 33 and 34, and yet remain secure in between them. Generally and normally, the rollers 37 remain engaged only with the upper parallel shaft pair 33 and free to roll on it. The rollers 37, are free to roll between two limits or stops, 35 and 36, which are attached to the adjacent ends of the two pairs of parallel shafts, 33 and 34. The lower pair of the parallel shafts 34 is meant to retain the wheel assembly 31 from falling off, whenever the castor assembly 30 is lifted off of the ground. During such conditions, the rollers 37 will get engaged with the lower shafts 34 and can roll on them, as in the other case discussed above.

Figure 7:
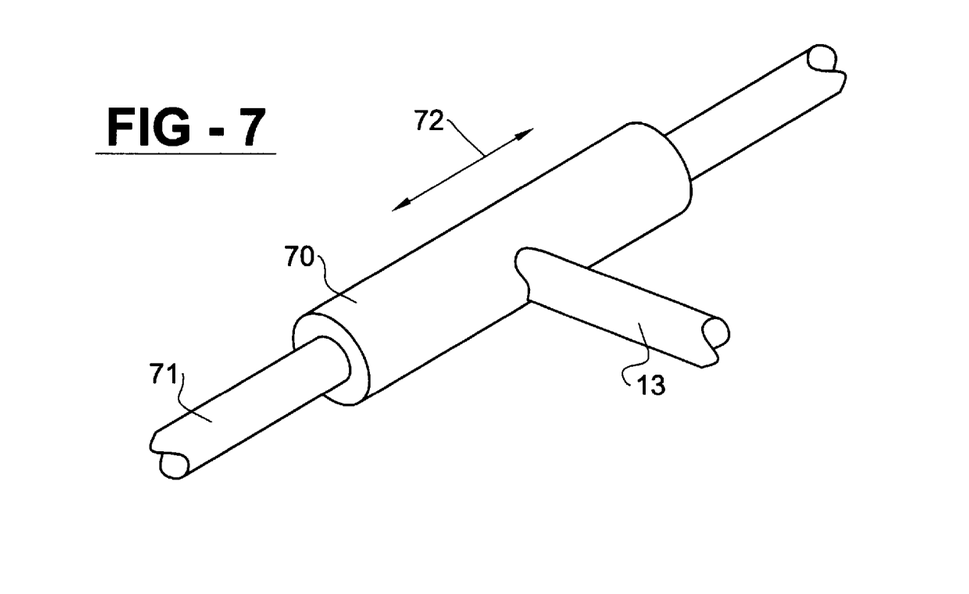
FIG. 7 is a fragmentary perspective view of an alternate coupling between the axle and a shaft.

As shown in the FIG. 7, instead of adopting the pulley and parallel shaft approach above, linear bearings or sliding bushes 70 can be attached on either ends of the axle 13, instead of the rollers 37. These bearings/bushes 70 slide on only one pair of matching cylindrical, parallel shafts 71 (only one end is shown), instead of two required in the previous case. These shafts 71 are attached to the bracket assembly 32 in the manner similar to the shafts 33 and 34 on opposite sides of the wheel 11, and the bearings/bushes 70 are free to slide along the shafts 71 as shown by an arrow 72. However, the sliding bearings/bushes 70 generally are more susceptible to dust and dirt accumulation than the rollers 37.

The parallel shafts 33 and 34 extend equally on either side of the center of the castor vertical revolving axis 12 of the free floating castors assembly 30, with the vertical axis being perpendicular to the longitudinal axes of the parallel shafts. The pairs of parallel shafts 33 and 34 are attached to the bearing separately on either side of the wheel 11 through legs 38 extending from the ends of the upper shaft 33 at an inward angle to a generally horizontally extending plate 39. The plate 39 is attached to a generally vertically extending shaft 40 that is rotatably retained in the bearing 15 attached to the trolley to enable smooth rotation of the vertical shaft.

Figure 4A:
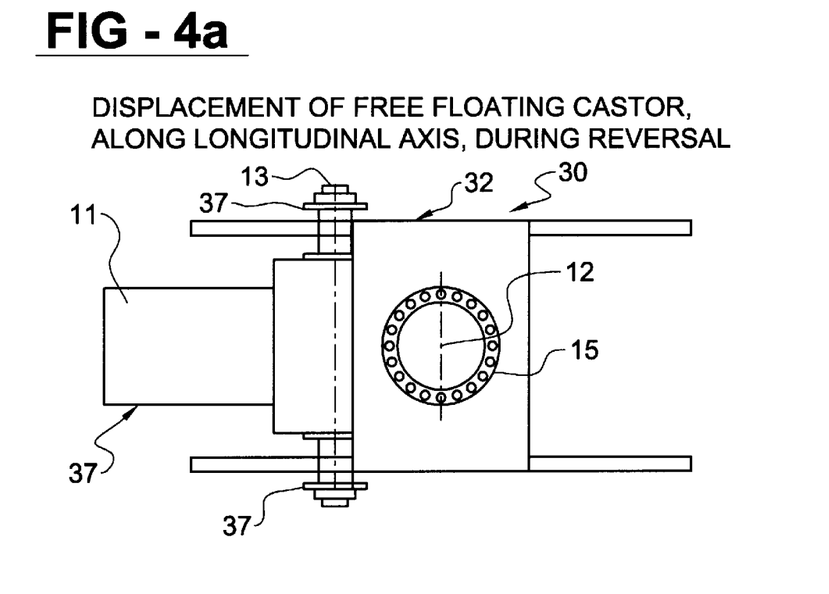
FIGS. 4a, 4c and 4e are plan views of the free floating castor in accordance with a first embodiment of the present invention.
Figure 4B:
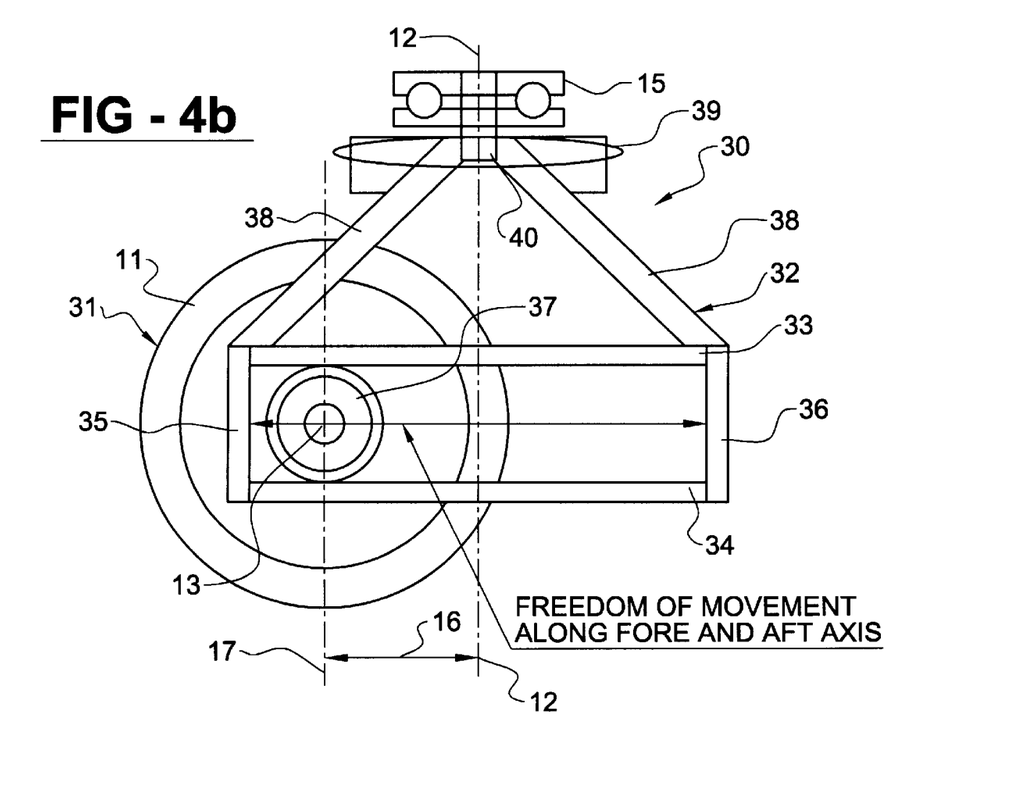
Figure 4C:
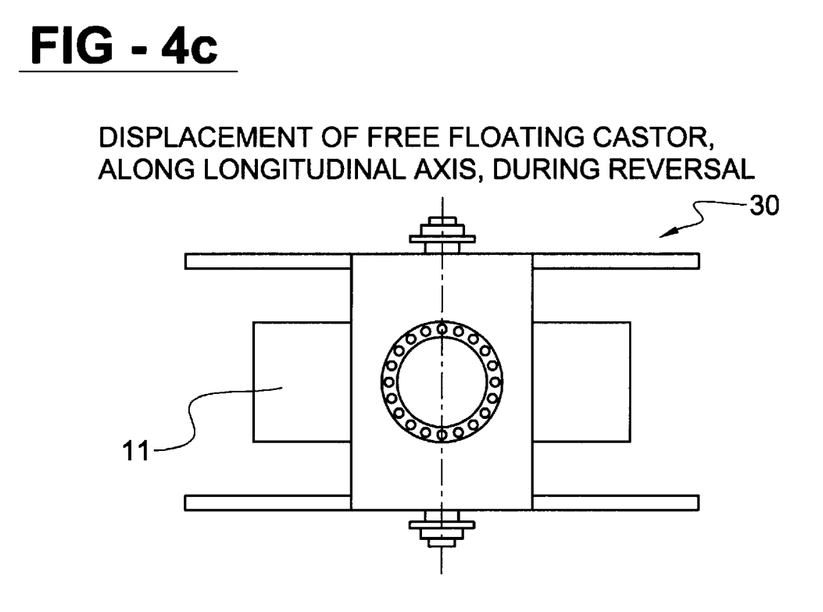
Figure 4D:
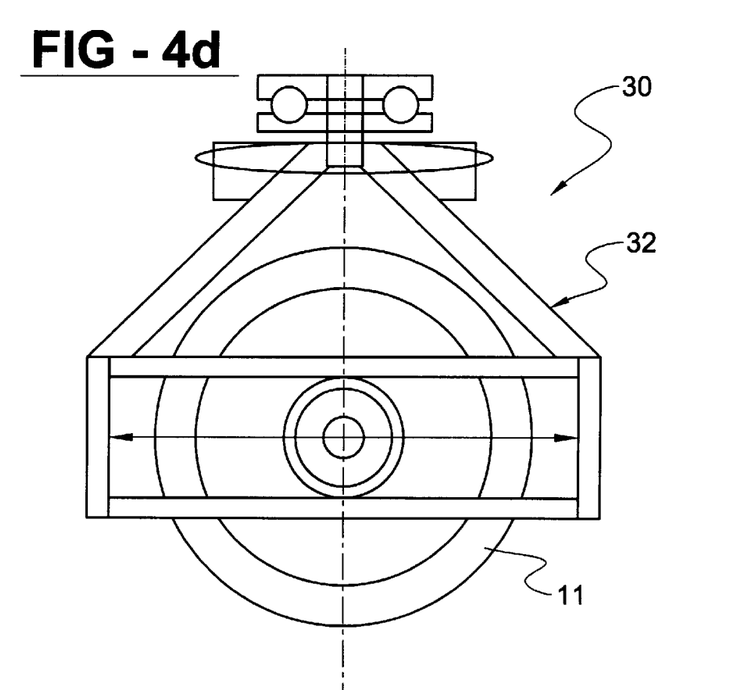
Figure 4E:
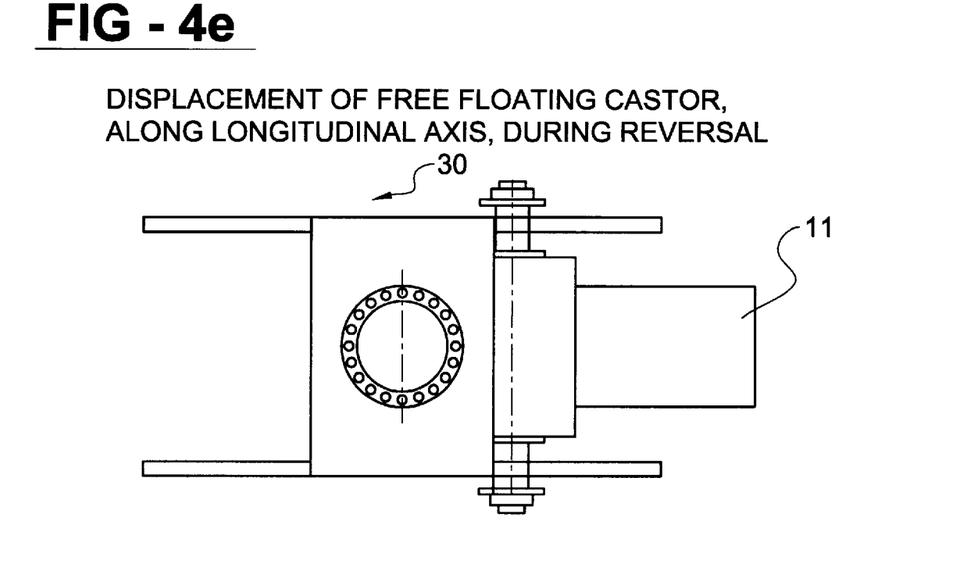
Figure 4F:
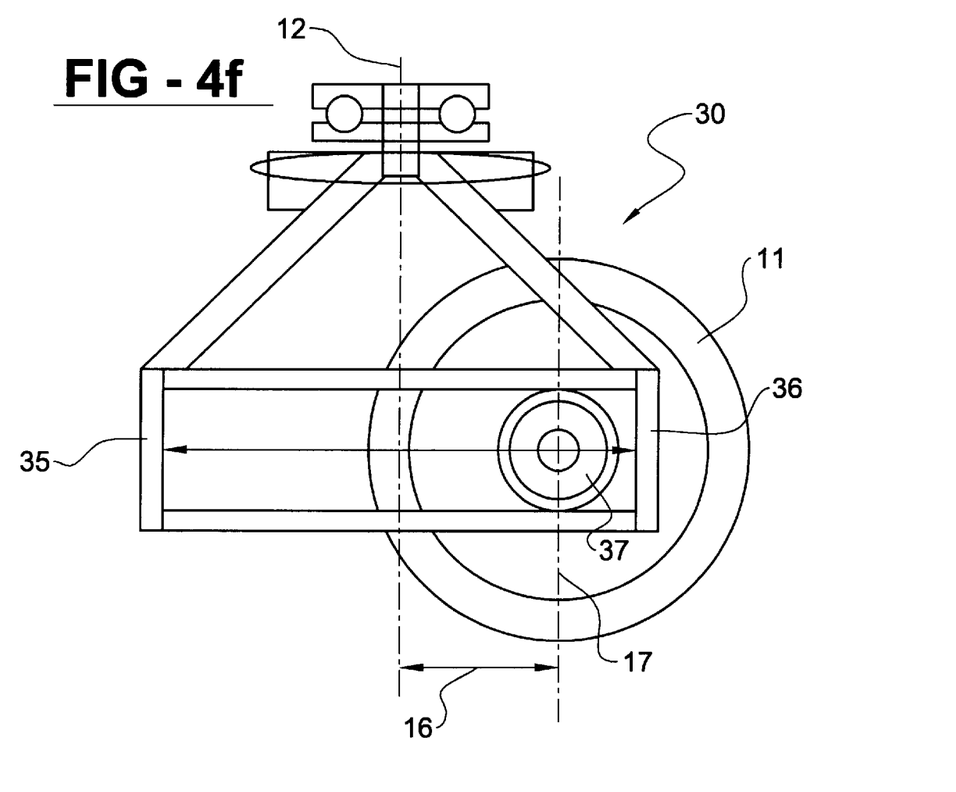

During motion of the trolley, there will be a certain degree of friction, due to the wheel 11 rolling on the ground and that of the wheel bearings. The cumulative affect of these forces acts on the wheel 11, in the direction opposite to that of the motion. This force will push and hold the wheels 11 against one of the stops 35 and 36 depending upon the direction of travel. For example, in the FIGS., 4a and 4b, the trolley is being moved toward the right so that the wheel assembly 31 is forced to the left wherein the pulleys 37 engage the left stops 35. In this position, the wheel 11 will be a stable trail position, similar to that of the standard castor.

In the previous discussion of "wedging" of the standard prior art castors, it was explained that as the trolley moves forward, the wheels tend to move inwards or outwards towards the castor vertical axis 12. But, since the distance 16 is fixed, the wheel will get wedged between the castor vertical axis 12 and the ground contact point 19. As such, it will only be possible for the wheels to move against friction; which will be a function of the weight on the respective wheel and its coefficient of friction.

It can readily be seen that none of the constraints identified above remain applicable in the case of the free floating castor 30. In that, first, there is a "freedom of motion/space" available. The wheels 11 can move along the longitudinal "Y" axis on the parallel shafts 33. As the trolley moves forward, the wheels 11 will start "lagging", with respect to the castor vertical axis 12 as shown in the FIGS. 4c and 4d. The parallel shafts 33 and 34 and the trolley will move, until the pulleys 37 attached to the wheels 11 hit the stops 36 at the opposite ends of the parallel shafts as shown in the FIGS. 4e and 4f. Second, even if the wheels 11 tend to revolve in the opposite directions, the wedging forces being generated will push them in the direction of the resultant force vector, i.e. opposite to the direction of motion. Once again, the wheels 11 will tend to remain stationary, with respect to the ground, until the stops are reached and then assume their trailing stable position. Third, there will be no extra effort required to counter the "friction", since the distance 16 is not fixed, but is variable.

Likewise, there will be no "fishtailing" or revolving in the wrong direction problem. The trolley will smoothly reverse direction, with minimal swing, if at all. We can see that, as the trolley tends to swing, there will be certain inertia generated, due to the mass/weight of the trolley (circular acceleration) which will act on the wheels 11, in equal and opposite direction. Since there will be no resistance to counter this force, except for the friction of the bearing of the pulleys 37 on the parallel shafts 33 and 34, the swing will be minimized.

Figure 5:
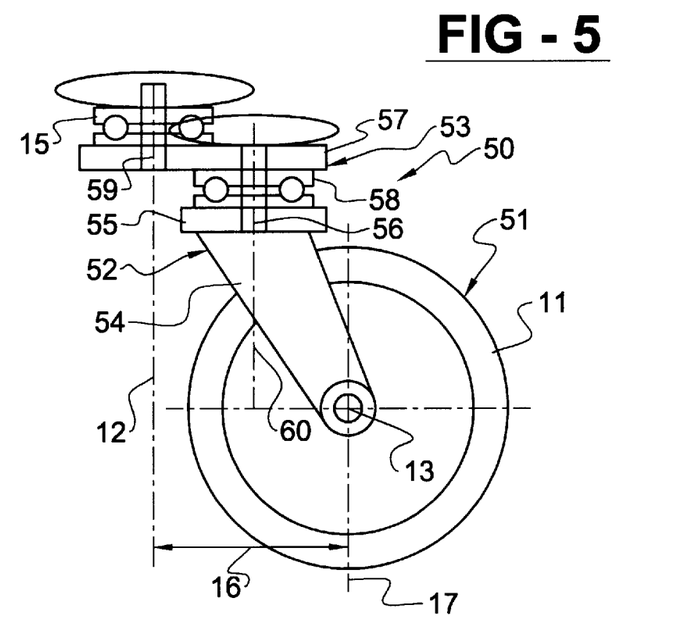
FIG. 5 is a schematic elevation view of the free floating castor in accordance with a second embodiment of the present invention.

A second embodiment of the free floating castor is shown in the FIG. 5. A double rotary joint free floating castor assembly 50, includes a wheel assembly 51, a bracket assembly 52 and a joint assembly 53. The wheel assembly 51 includes the standard wheel 11 and axle 13. The wheel assembly 51 is attached to a lower end of the bracket assembly 52. The bracket assembly 52 includes a bracket 54 similar to the standard bracket 14 but having an upper end terminated in a generally horizontally extending first plate 55 spaced both vertically and horizontally from the bearing 15 adapted to be attached to a trolley (not shown). Extending upwardly from the plate 55 is a first shaft 56. The joint assembly 53 includes a generally horizontally extending second plate 57 positioned above the first plate 55 and having a joint bearing 58 attached to an underside thereof for rotatably retaining the first shaft 56. Extending upwardly from the second plate 57 is a second shaft 59 that is rotatably retained by the bearing 15.

Figure 6A:
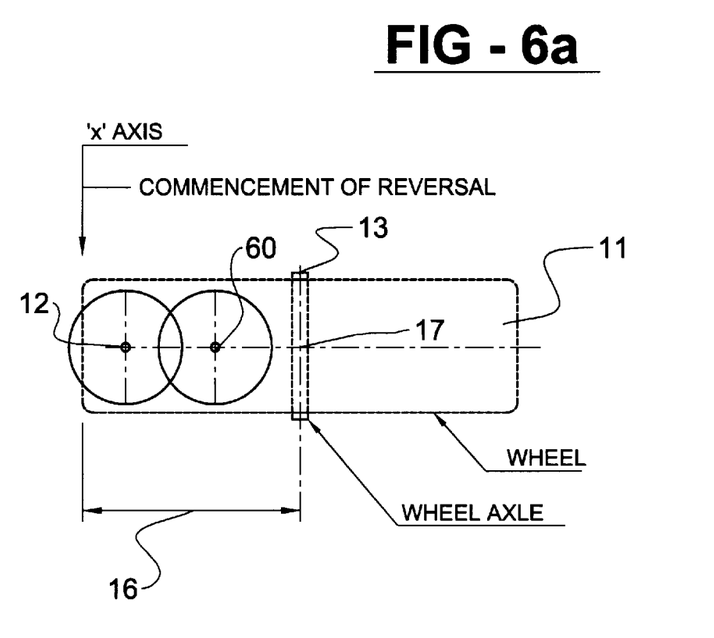
FIGS. 6a through 6e are schematic plan views of the free floating castor shown in the FIG. 5.
Figures 6B, 6C:
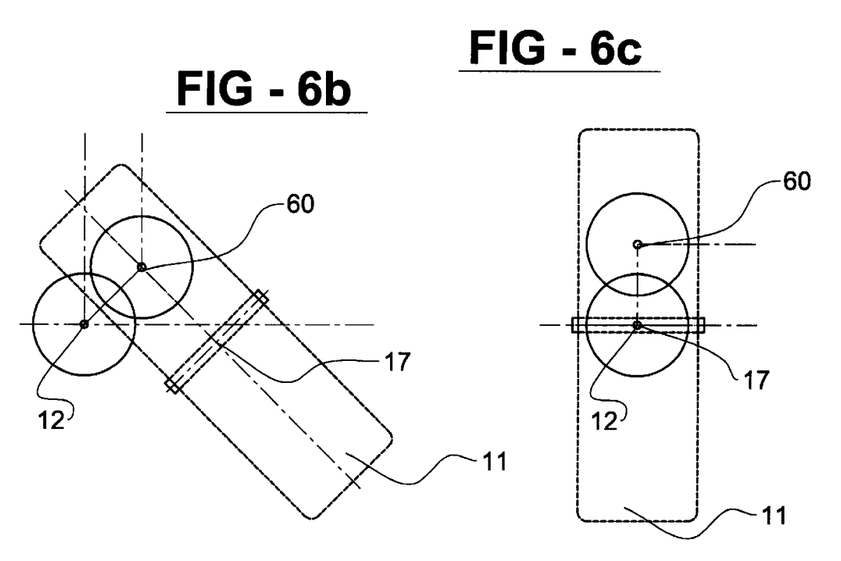
Figure 6D:
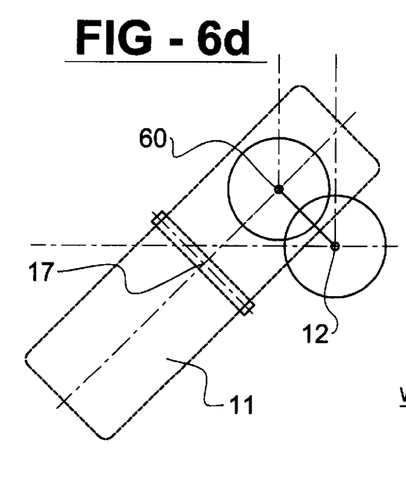
Figure 6E:
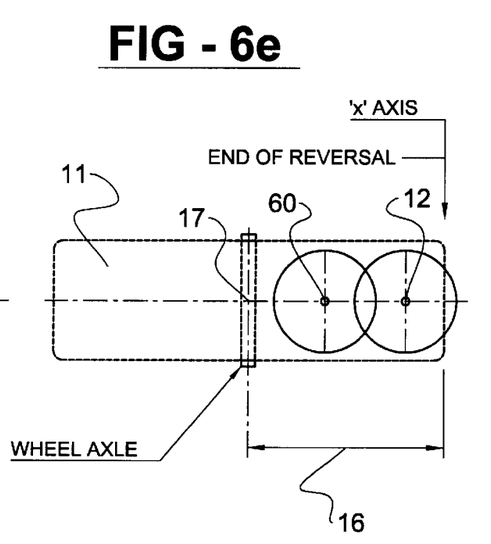

The second shaft is aligned with the castor vertical axis 12 that is spaced the distance 16 from the wheel vertical axis 17. The first shaft 56 is shown as being ideally positioned midway between the vertical axes 12 and 17 at a joint vertical axis 60. However, the joint vertical axis 60 could be spaced unequally between the other two axes. Now, the wheel vertical axis 17 can revolve around the joint vertical axis 60 which, in turn, can revolve around the castor vertical axis 12. During motion of the caster assembly 50 in a straight line, the axes 12, 60 and 17 will lie in a straight line over the distance 16 (see the FIGS. 6a and 6e). Since the wheel axis 17 has freedom to revolve around the joint axis 60, in a circle of diameter equal to the distance 16, the wheel 11 can assume any position within the circle (see the FIGS. 6b and 6e) having the radius equal to the distance 16 and even can be superimposed on the castor vertical axis 12 as shown in the FIG. 6c. Thus, the constraints of the standard prior art castor can be overcome through this approach as well. Similar to the case of the parallel float shaft assembly 30, the wheels 11 remain stable in trail position during constant motion.

While reversing, the wheels 11 will deviate, being in an unstable state. The point of contact will again act as the pivot point. Wedging/frictional forces will tend to compress the "trail arm" bracket 54. As the trolley moves forward, each wheel 11 will also tend to rotate over its ground contact point. Consequently, certain torque will develop at the point 19, due to friction of rotation, which will resist the rotation. These forces will cumulatively act on the bracket assembly 52 and the joint assembly 53 folding at the junction defined by the joint vertical axis 60 (see the FIG. 6b). As the trolley moves further, the trail arm will progressively contract, until it crosses the castor vertical axis 12 (see the FIG. 6c), and then extend fully to the trail position (see the FIG. 6f).

No special process, technology, etc, is needed to fabricate or produce the free floating castors. The entire assembly can be fabricated according to any design specifications. There is no limit either to its size or weight carrying capacity. Similarly, any suitable material/available components, such as the shafts, wheels, bearings, etc., could be used for manufacturing the various items of the assembly. The only added cost to that of the standard castors, will be that of the parallel shafts in the first embodiment or the rotary joint in the second embodiment, an additional bearing for each assembly, and the additional machining and fabrication charges thereof.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A castor apparatus for attachment to a trolley comprising:
   a bearing adapted to be attached to a trolley and having a castor vertical axis extending generally vertically therethrough;
   a bracket assembly rotatably connected by said bearing at said castor vertical axis;
   a pair of generally horizontally extending upper shafts connected to said bracket positioned on opposite sides of said castor vertical axis; and
   at least one wheel assembly including a wheel for engaging and rolling along a ground surface and an axle upon which said wheel is mounted, said axle having opposite ends positioned below and slideably engaging said horizontally extending upper shafts throughout the length of the shafts thereby permitting free movement of said at least one wheel assembly transverse to said castor vertical axis within an area surrounding said castor vertical axis as determined by a length of said horizontally extending upper shafts whereby when said bearing is attached to said trolley, said at least one wheel assembly trails said castor vertical axis along a path of travel of said trolley and said wheel is prevented from wedging and fishtailing upon reversal of direction of travel of said trolley.

2. The castor apparatus according to claim 1 wherein said wheel assembly includes a pair of pulley type rollers each attached to an opposite end of said axle for slideably engaging said horizontally extending upper shafts.

3. The castor apparatus according to claim 1 further comprising stops attached at opposite ends of said horizontally extending upper shafts for limiting movement of said wheel assembly transverse to said castor vertical axis.

4. The castor apparatus according to claim 3 wherein said stops on each of said horizontally extending upper shafts are positioned equidistant from said castor vertical axis.

5. The castor apparatus according to claim 3 further comprising a pair of generally horizontally extending lower shafts connected to said stops and positioned opposite said horizontally extending upper shafts such that said pulley type rollers move between said horizontally extending upper shafts and said horizontally extending lower shafts.

* * * * *